United States Patent

[11] 3,614,331

[72] Inventor Evert M. Hoekstra
Garden Grove, Calif.
[21] Appl. No. 763,593
[22] Filed Sept. 30, 1968
[45] Patented Oct. 19, 1971
[73] Assignee MKH, Inc.

[54] KEYBOARD PULSE GENERATOR INCLUDING A LOCKING PLATE FOR USE IN TELEPHONE DIALING
2 Claims, 6 Drawing Figs.

[52] U.S. Cl. .......... 179/90 K
[51] Int. Cl. .......... H04m 1/32
[50] Field of Search .......... 179/90 K, 90 B, 90 CI; 340/345, 359, 365; 178/79, 80

[56] References Cited

UNITED STATES PATENTS

| | | | |
|---|---|---|---|
| 2,407,889 | 9/1946 | MacKenzie | 179/90 |
| 2,927,971 | 3/1960 | Busala | 179/90 |
| 3,162,725 | 12/1964 | Oleson | 178/79 |
| 2,818,558 | 12/1957 | Abbott | 340/359 |
| 2,794,976 | 6/1957 | Faulkner | 340/359 |
| 2,373,134 | 4/1945 | Massonneau | 177/353 |

FOREIGN PATENTS

| | | | |
|---|---|---|---|
| 779,970 | 3/1968 | Canada | 179/90 |

*Primary Examiner*—Kathleen H. Claffy
*Assistant Examiner*—Tom D'Amico
*Attorneys*—Clarence A. O'Brien and Harvey B. Jacobson

ABSTRACT: A pushbutton keyboard dialing system including generator means for producing a pulse train indicative of a particular actuated pushbutton. A mechanical interlock is provided for inhibiting successive pushbutton depression until the entire pulse train of an actuated pushbutton has cleared the system.

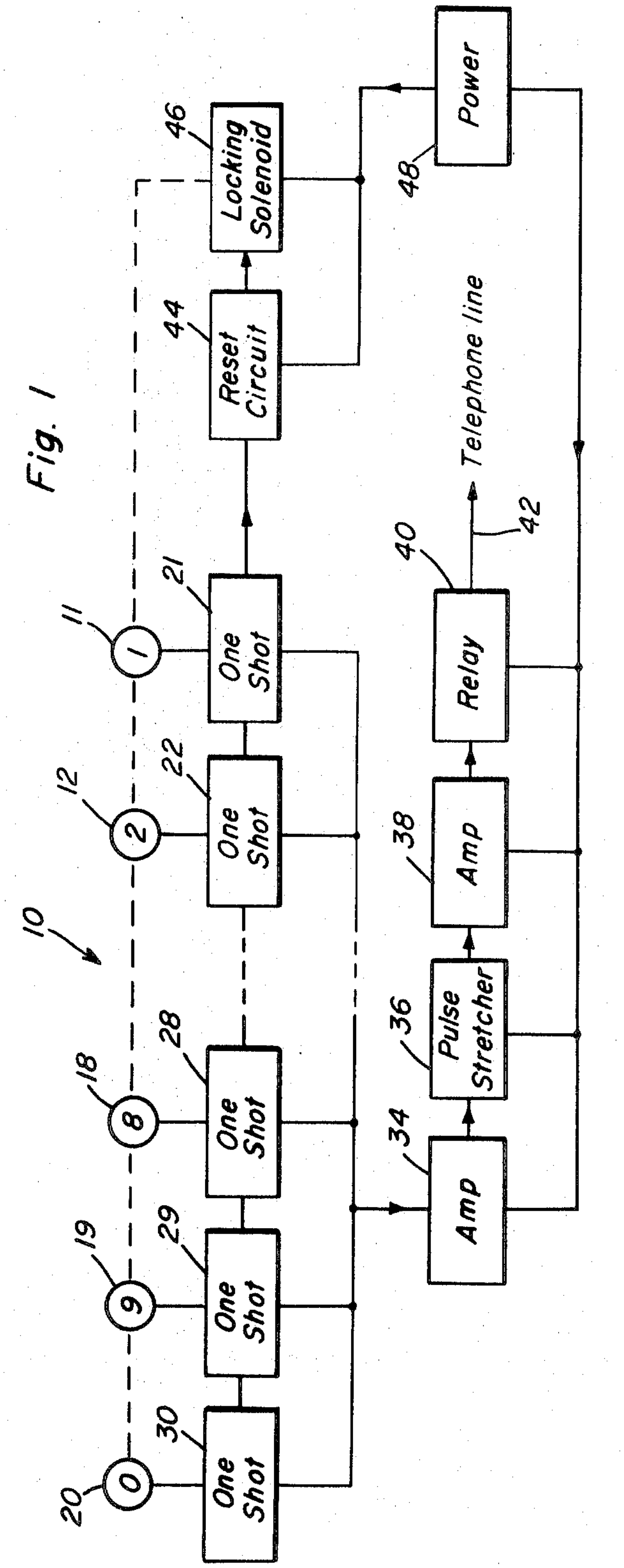
Fig. 1
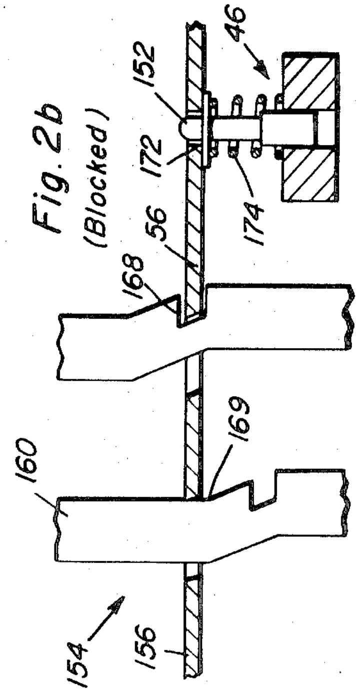
Fig. 2b (Blocked)
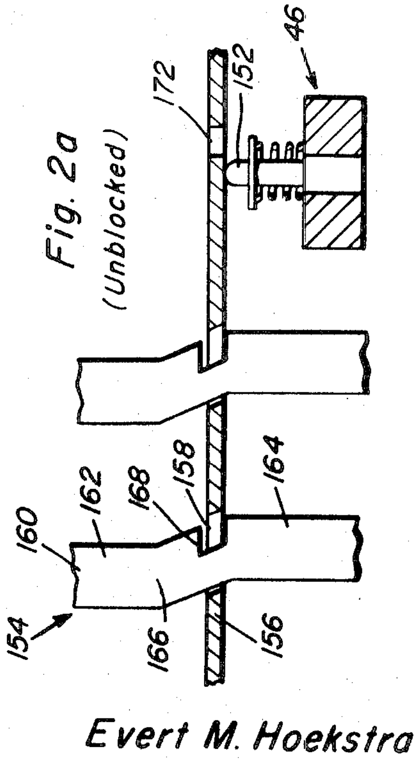
Fig. 2a (Unblocked)
Evert M. Hoekstra
INVENTOR.
BY Clarence A. O'Brien
and Harvey B. Jacobson
Attorneys Evert M. Hoekstra
INVENTOR.
BY Clarence A. O'Brien
and Harvey B. Jacobson
Attorneys

KEYBOARD PULSE GENERATOR INCLUDING A LOCKING PLATE FOR USE IN TELEPHONE DIALING

The present invention relates to telephone apparatus and more particularly to a dialing system therefor.

Recent developments in the telephone industry has brought pushbutton-type telephones to the telephone subscriber. This type of telephone has been developed by the Bell System and utilizes audio tone generators operated by pushbuttons, to generate electrical signals of different frequencies representing dialed numbers. However, the newly devised pushbutton system requires a radically different type of central office equipment and a considerable capital outlay. This presents a burden for the small independent telephone company of which there are approximately 2,000 in the United States at the present time with an investment of $9 million; operating revenues of $2 million and a total number of employees in excess of 125,000.

The older-type dial telephone employs relay closures for generating a dial number signal in the form of pulse trains of longer duration. The characteristics of such signals are standardized in accordance with international agreement. Until the present time, several attempts have been made to design an economical and compact pushbutton dialing system for generating the standard pulse signals, but these designs have produced somewhat disappointing results.

The present invention includes a dialing system for generating telephone line signals from a subscriber's set in accordance with international specification. The present invention minimizes utilization of mechanical components by extensively employing solid state components. Further, a mechanical interlock mechanism prevents a subscriber from successively depressing the pushbuttons too rapidly which would cause the generation of erratic signals.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an electrical block diagram illustrating the block components of the present system.

FIG. 2*a* is a partial sectional view of an interlock mechanism shown in the unblocked position.

FIG. 2*b* illustrates the interlock mechanism in the blocked position.

Figures 3, 4, 5:
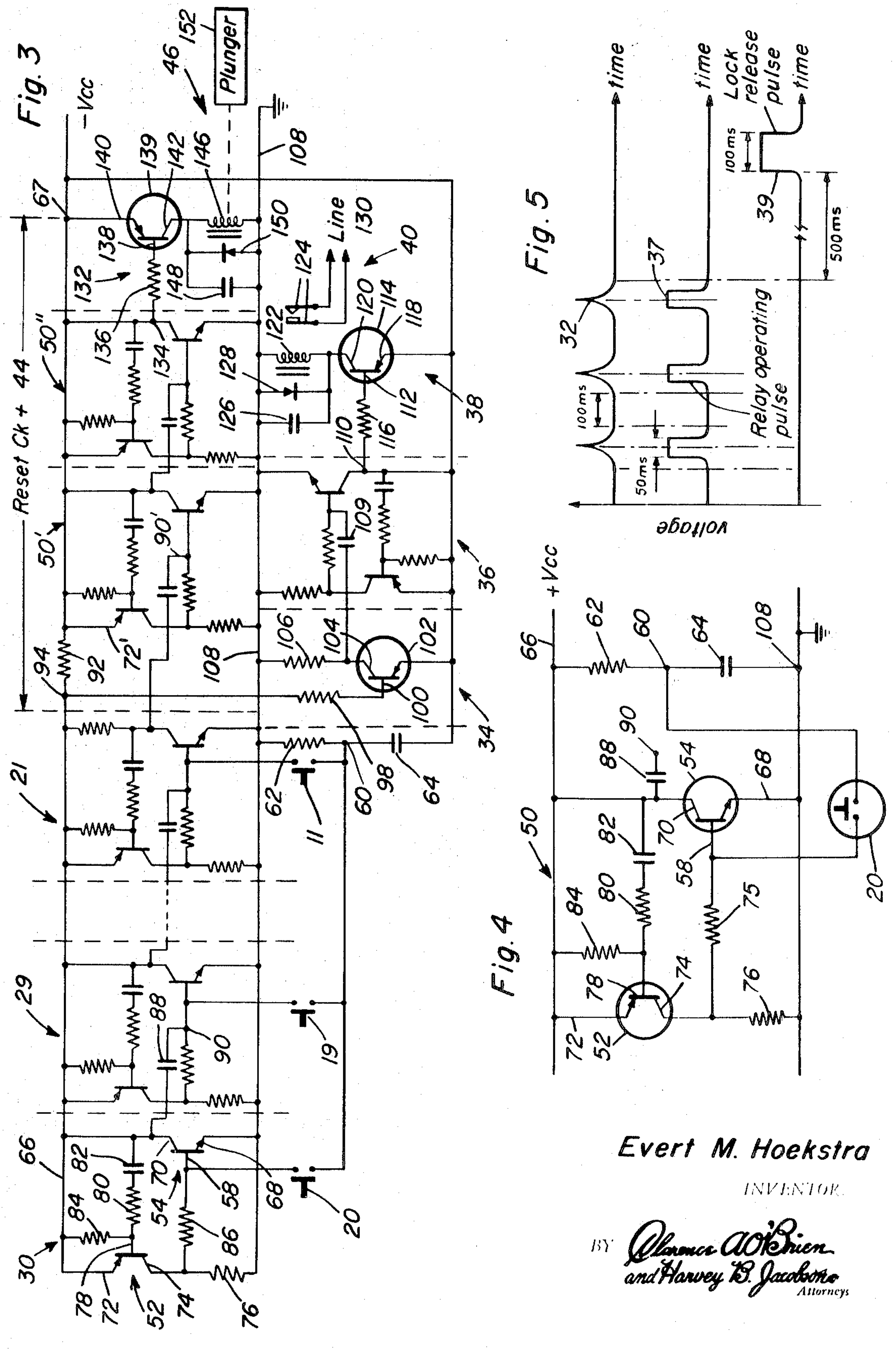
FIG. 3 is an electrical schematic diagram of the present invention.
FIG. 4 is an electrical schematic diagram illustrating a monostable multivibrator for generating a pulse after being triggered by a pushbutton switch.
FIG. 5 is a simplified graphical illustration of the voltage signals developed in the circuit of the present invention.

Referring specifically to the drawings and more particularly to FIG. 1, reference numeral 10 generally denotes the dialing system of the present invention and is seen to include a plurality of pushbutton switches disposed upon the dialing panel of a pushbutton telephone. Briefly, these switches are denoted by reference numerals 11–20 corresponding to the pushbuttons associated with numerals 1–0 (operator). Each pushbutton switch is of the single pole, single throw type. Ten successively cascaded monostable multivibrator (one-shot) stages are interconnected and indicated by reference numerals 21–30. Each stage has a trigger input connected to a respective pushbutton switch. The cascaded stages operate so that depression of a particular pushbutton switch causes the triggering of an associated one-shot causing the generation of an output pulse along an output line common to all stages. During the trailing edge portion of this generated pulse, the triggered one-shot actuates a successive stage thereby causing the generation of a second pulse on the output line. This operation is repeated until the terminal cascaded stage 21 generates a pulse. Thus, a pulse train is generated including a number of pulses indicative of the numeral associated with the depressed pushbutton. By way of example, depression of pushbutton 18, corresponding to numeral 8, results in the generation of a pulse train having eight equally spaced pulses.

The output signal or pulse train appearing in the form of voltage spikes 32 as depicted in FIG. 5 is fed to the input of a pulse amplifier 34 having an output connected to a pulse shaping network or pulse stretcher 36. The output from pulse stretcher 36 includes a train of pulses each output pulse having a preselected duration. The output from pulse stretcher 36 drives a second pulse amplifier 38 which in turn drives a relay component 40. The closure signals from the relay are impressed upon a conventional telephone line 42 so that the number dialed by a subscriber may be communicated to central office equipment.

As previously mentioned, the characteristics of a generated pulse train must fall within internationally set specifications. With respect to the present system, these specifications dictate that the contacts of relay 40 have a closure duration lasting about 50 milliseconds; and that successive closures have a rate of between 8 and 10 per second with a pause of about 500 milliseconds between pulse trains. In the present system, the required closures are obtained by rhythmically energizing relay 40 by pulses 37 as depicted in FIG. 5 to obtain an output identical to that of a conventional dial-type telephone. This is accomplished by generating a pulse train, from the one-shot cascaded stages, having a 100-millisecond delay between successive pulses as also depicted in FIG. 5.

The present invention includes a mechanical pushbutton interlock which prevents rapid successive depression of the pushbuttons during a dialing operation. This is to permit the entire pulse train generated from depression of a particular button to clear through relay 40 before a second pulse train, effected by a second depressed button, is generated. Thus, the required pauses between pulse trains are obtained by locking the buttons for a period equal to the time needed to pulse-out the desired train plus an additional 500 milliseconds preceding a 100-millisecond lock release pulse 39 as shown in FIG. 5. Therefore, by way of example, if the zero (operator) button is depressed, all buttons are locked for a period of approximately 1.5 seconds. The 500-millisecond delay is obtained by driving a reset circuit 44 from the output of the terminal one-shot stage 21 before pulse 39 actuates a locking mechanism 46 for mechanically unlocking the pushbutton switches in a manner explained hereinafter.

A source of DC power 48 is suitably connected to the circuitry shown in FIG. 1 in order to effect proper system operation.

The electronic circuitry for the block diagram shown in FIG. 1 is more particularly illustrated in FIG. 3. This circuitry extensively utilizes one-shot or monostable multivibrator circuits of the form shown in FIG. 4. The latter figure represents a single one-shot circuit which may be fabricated in the form of a printed circuit module or integrated circuit module. The module is indicated by reference numeral 50 and is seen to include a first PNP transistor 52 and a second NPN transistor 54 connected in cooperating relation to effect monostable multivibrator operation. Pulse operation of the circuit commences with the introduction of a trigger signal on the base 58 of the second transistor 54. In order to generate such a trigger signal, switch 20 is connected so that one contact of the single pole, single throw switch is connected to base 58 of transistor 54 while the second contact is connected to a junction point 60 defined between serially connected resistor 62 and capacitor 64. The branch formed by resistor 62 and capacitor 64 is connected between the positive terminal 66 of power supply 48 and ground 108 so that during quiescent operation of the circuit, capacitor 64 charges. The emitter terminal 68 of transistor 54 is grounded while the collector 70 of the transistor 54 is connected to positive voltage line 66. The emitter terminal 72 of transistor 52 is likewise connected to the voltage line 66 while the collector 74 of transistor 52 is connected to the base 58 of transistor 54 through load resistor 75. Collector 74 of transistor 52 is also connected to ground via a load resistor 76. The base terminal 78 of transistor 52 is coupled to collector 70 of transistor 54 through a serial path including transition speedup resistor 80 and a coupling capacitor 82. To increase the rate at which capacitor 82 discharges, as hereinafter explained, a second charge dissipating resistor 84 is connected between the base terminal 78 of transistor 52 and the voltage line 66. The output at 90 from the multivibrator stage is taken at the collector terminal 70 of transistor 54 through a coupling capacitor 88.

The one-shot stage 50 commences operation by depressing switch 20 which causes capacitor 64 to discharge rapidly thus introducing a trigger pulse into base 58 of transistor 54. Initially, both transistors are in the cutoff state so that actuation of transistor 54 causes conduction of the transistor which in turn causes the collector voltage to decrease. This lowered voltage takes the form of a negative going pulse which is coupled through capacitor 82 and resistor 80 to the base 78 of cutoff transistor 52. The negative going pulse forward biases the emitter-base junction of transistor 52 so that the transistor begins to conduct. Conduction current generated by transistor 52 is coupled to base 58 of transistor 54 through coupling resistor 75 which causes transistor 54 to conduct more heavily. This regenerative process continues until transistors 52 and 54 enter saturation. The transistors remain in this condition until capacitor 82 has been charged sufficiently thereby developing a bucking voltage tending to decrease the base current of transistor 52 so that it no longer remains in saturation. The reduction in base current commensurately results in a reduction in collector current and is evidenced by a negative going current pulse transmitted to base 58 of transistor 54 through coupling resistor 75. Application of the negative going current pulse to the transistor base causes a sharp decrease in the conduction of transistor 54 due to a lessening of the forward bias condition of the base-emitter junction. This degenerative process continues until both transistors regain their original cutoff condition. Capacitor 82 then discharges to the positive voltage line 66 through resistors 80 and 84. Thus, one cycle of operation is completed and a spike output is derived at the collector 70 of transistor 54 through coupling capacitor 88.

In FIG. 3, the cascaded one-shot stages 21–30 are interconnected so that the pulse output of each stage is coupled to the input to a succeeding stage, the input being connected in parallel with a pushbutton switch associated with the succeeding stage. The last stage 30 being associated with the zero, or operator pushbutton has but one input, that being pushbutton switch 20. Thus, depression of any pushbutton switch results in the triggering of an associated one-shot stage which produces a pulse output, the trailing edge of which in turn causes sequential triggering of succeeding cascaded stages until a final pulse is generated by the one-shot stage 21 associated with the number 1 pushbutton indicated by 11.

Referring once again to FIG. 4, coupling capacitor 82 and dissipating resistors 80 and 84 determine the time constant associated with the discharge of the capacitor as previously discussed. The values for these components are chosen so that the time constant is approximately 100 milliseconds.

Referring to FIG. 3, it will be noted that the 10 one-shot stages share a common load resistor 92 which connects positive voltage line 66 to the power supply line 67. The resistor in conjunction with stray capacitance causes differentiation of the pulses generated by the one-shot stages, so that spike pulses are formed. The resistor includes a first end 94, serving as an output point connected to the input of amplifier stage 34, through an input resistor 98 serially connected to the base terminal 100 of PNP transistor 102 so that the spike pulses 32 appear thereacross. The transistor 102 forms a one-stage common emitter amplifier further including a collector 104 connected to a ground line 108 through a load resistor 106. The output from the amplifier stage is derived at the collector terminal 104 which transmits an amplified train of spike pulses having a number of spikes indicative of the number associated with a depressed pushbutton. The output from transistor 102 is coupled to a succeeding stage through a coupling capacitor 109. This succeeding stage is denoted by 36 and includes the modular circuitry similar in arrangement to the one-shot stage shown in FIG. 4. The duration between spike pulses is approximately 100 milliseconds. Stage 36 serves a pulse-stretching or wave-shaping function by developing pulses having 50-millisecond durations. The output from the pulse stretcher stage 36 at 110 is fed to the input of a succeeding amplifier stage 38 through a coupling resistor 116.

The amplifier stage 38 includes a base terminal 112 to which coupling resistor 116 is connected. The amplifier stage may be characterized as a common emitter stage having an emitter 118 connected to the positive voltage line 67. The relay component 40 includes a relay coil 122 connected between the collector 120 of transistor 114 and ground line 108 and relay contacts 124 which are connected to a telephone line as indicated by reference numeral 130. A capacitor 126 is connected in parallel with relay coil 122. Further, a diode 128 having a grounded anode is connected in parallel with the relay coil 122. In operation, an output pulse develops at collector 120 upon application of a pulse to the base terminal 112 thereof, in accordance with the pulse train generated at the output of the preceding pulse stretcher stage 36. These pulses are amplified by transistor 114 so that amplified current pulses are applied to coil 122. The diode serves to limit the polarity of pulses going to coil 122 in a negative direction only. The parallel combination of capacitor 126 and coil 122 permits electrical energy exchange therebetween so that current flow through coil 122 is maintained in accordance with a time constant determined by the inductance of coil 122 and the capacitance of capacitor 126. Conduction of current through relay coil 122 causes the relay contacts 124 to close for a time duration dependent upon the time constant. Relay contact closure causes the transmission of a pulse 37 along telephone line 130.

The output from the last triggered one-shot stage 21 associated with the number 1 pushbutton indicated by 11 is applied to the input of a reset circuit generally denoted by reference numeral 44. The purpose of this reset circuit is to cause a depressed pushbutton switch actuator to return to an upright ready position as explained hereinafter. More specifically, the reset circuit 44 includes two cascaded one-shot stages, each said stage being identical in configuration to that shown in FIG. 4. The input terminal of the reset circuit 44 is indicated by 90', and a pulse applied thereto causes formation of a spike pulse at the output of the first one-shot stage denoted by 50'. The spike is in turn applied to the second cascaded one-shot stage 50'' after a 500-millisecond delay. The pulse output from the second one-shot stage 50'' is in the form of a 100-millisecond duration pulse generated at the output of the second one-shot stage 50'' as indicated by reference numeral 134. This output is applied to an amplifier stage 132 of the reset circuit 44 in order to develop the lock release pulse 39. This stage includes an input resistor 136 connected between the input terminal 134 and the base terminal 138 of a PNP transistor 139 connected in a common emitter configuration having an emitter terminal 140 directly connected to the positive voltage line 67. The collector 142 of the transistor 139 is connected to ground line 108 through a serially connected solenoid coil 146 forming part of the locking mechanism 46. The coil is connected in parallel with a capacitor 148 and a diode 150 which serve the same function as the capacitor 126 and diode 128 in the aforementioned amplifier stage 38. Energization of solenoid coil 146 by pulse 39 causes displacement of a plunger member 152.

Actuation of the plunger member 152 shown in FIG. 3 causes reset of the pushbutton panel 154 shown in FIG. **2*a*. The essential parts of this panel include a plate member 156 which is spring-loaded in a direction to urge the plate to the right as viewed in FIGS. 2*a* and 2*b*. The plate includes a slot or aperture 158 therein for each pushbutton switch actuator 160. The actuator includes a first elongated portion 162 and a second elongated offset portion 164. A camming portion 166 connects the first two connector portions. A notch 168 is formed in one side of the actuator 160** so that depression of actuator 160 causes the lowering of the actuator as well as cammed displacement of plate 156 in the left direction against its spring bias. The intersection between offset portion 162 and connecting portion 166 defines an angular keeper portion 169 which engages the undersurface of aperture 158 thereby preventing a depressed button from returning upwardly after removal of finger pressure as shown on the left in FIG. 2*b*. In addition, the displacement of plate 156 causes plate 156 to be received within the notches 168 of the upwardly remaining actuators as shown on the right in FIG. 2*b*.

A small aperture 172 is formed within plate 156 and is adapted to be engaged by the plunger member 152 of solenoid 46. Once so engaged, the plate cannot return to its original position. However, upon actuation of the reset pulse 39 from reset circuit 44, the plunger member 152 is attracted downwardly against the bias of spring 174 thereby disengaging the same from aperture 172. This frees plate 156 to be influenced by spring tension which causes displacement of the plate in a right direction thereby permitting the depressed actuator 160 to rise upwardly and unlock all pushbutton actuators for subsequent depression.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A telephone dialing system comprising a dialing panel having a plurality of successive pushbutton switches, means responsive to depression of a selected one of said switches for generating a pulse train having a number of pulses therein representative of the selected switch, means for shaping said pulses, a voltage source, relay means connected to said voltage source and responsive to the resulting shaped pulses for effecting a number of relay closures dependent upon the number of pulses in said train, and means for connecting the output of said relay means to a telephone line, wherein the pushbutton switches include actuators, a slidable plate mounting the actuators, camming means formed on the actuators to cooperate with the plate for displacing the plate in response to depression of an actuator, and means formed in the actuators for selectively contacting the plate in its displaced position thereby preventing depression of other actuators during the time said actuator remains depressed, the means formed in the actuators having a plurality of notches, and wherein the plate is spring-biased and has a plurality of apertures normally permitting free passage of an actuator therethrough, displacement of the plate causing said engagement between the notch of the depressed actuator and the wall of an associated aperture, latch means for maintaining the plate means in the displaced position, and reset means for retracting said latch means thereby returning the plate to an original biased position, the latch means comprising a solenoid for engaging an opening in the plate when the plate is displaced, said reset means including a pulse shaping circuit responsive to the last pulse of said pulse train, the solenoid being energizable by said shaping circuit to cause disengagement between the solenoid and the plate.

2. The device set forth in claim 1 wherein said means for generating a pulse train comprises a plurality of cascaded monostable multivibrator stages, each of said stages being triggered by a corresponding switch, said triggered stage causing commensurate triggering of successive cascaded stages.